United States Patent [19]
Cantwell

[11] Patent Number: 4,987,737
[45] Date of Patent: Jan. 29, 1991

[54] FUEL CONTROL SYSTEM FOR GAS TURBINE AEROENGINE OVERSPEED PROTECTION

[75] Inventor: Hugh F. Cantwell, Derby, England

[73] Assignee: Rolls-Royce plc, London, England

[21] Appl. No.: 418,721

[22] Filed: Oct. 3, 1989

Related U.S. Application Data

[63] Continuation-in-part of Ser. No. 384,901, Jul. 25, 1989, abandoned, which is a continuation of Ser. No. 111,065, Oct. 22, 1987, abandoned.

[30] Foreign Application Priority Data

Nov. 26, 1986 [GB] United Kingdom ............... 8628296

[51] Int. Cl.$^5$ ............................................. F02C 9/28
[52] U.S. Cl. ............................................... 60/39.281
[58] Field of Search ..................................... 60/39.281

[56] References Cited

U.S. PATENT DOCUMENTS

| | | | |
|---|---|---|---|
| 2,986,126 | 5/1961 | Werts | 60/39.281 |
| 3,050,941 | 8/1962 | Rogers | 60/39.281 |
| 3,808,801 | 5/1924 | Taylor | 60/39.281 |
| 4,716,723 | 1/1988 | Ralston et al. | 60/39.281 |
| 4,738,547 | 4/1988 | Agostino et al. | 60/39.281 |

Primary Examiner—Louis J. Casaregola
Attorney, Agent, or Firm—Cushman, Darby & Cushman

[57] ABSTRACT

A fuel control system for gas turbine aeroengine includes an overspeed limiter unit operative to limit fuel flow when engine speed exceeds a predetermined safe value. It is conventional for such overspeed limiters to be activated only in the event of an overspeed, so as to obviate the possibility that the limiter unit may fail unnoticed while the unit is dormant, the invention utilises the limit unit as an active part of the fuel control system on a continuous basis. Specifically, the overspeed limiter unit is used to control the pressure drop across a fuel metering unit as a function of engine speed, except when it is actually performing its overspeed limiting task. Specific means of accomplishing this are disclosed. In this way, any failure in the limiter unit will be immediately apparent due to its effect on the functioning of the system, and appropriate action can be taken.

8 Claims, 2 Drawing Sheets

FUEL CONTROL SYSTEM FOR GAS TURBINE AEROENGINE OVERSPEED PROTECTION

This is a continuation-in-part of application Ser. No. 07/384,901, filed July 25, 1989, now abandoned which is a continuation of application Ser. No. 111,065, filed Oct. 22, 2987, now abandoned.

FIELD OF THE INVENTION

The present invention relates to a fuel control system for a gas turbine aeroengine, and in particular to such a control system provided with a novel form of overspeed limiter.

BACKGROUND OF THE INVENTION

In any fuel control system for a gas turbine aeroengine it is necessary to ensure that the probability of a control system component failure causing serious problems in control of the aircraft is extremely remote. This is particularly important in the case of an engine fitted with a FADEC (Full Authority Digital Electronic Control) system, where component failure, if it happens, is more likely to make control of the engine from the aircraft flight station difficult or impossible than was the case with previous types of systems. The most dangerous type of component failure is one which causes a large oversupply of fuel to the engine, leading to a hazardous overspeed of the engine's compressor and turbine. Consequently, it is usual to provide fuel control systems with units (hereinafter referred to for the purposes of this specification as "overspeed limiters") which detect any overspeeds and automatically reduce the supply of fuel to an amount which does not cause the engine to overspeed.

One problem with current types of overspeed limiters is that, by definition, they are not normally in control of the engine and are only activated in an emergency. Consequently, the limiter unit itself may fail unnoticed whilst the unit is dormant, thus making the unit unable to perform its function correctly when activated. Hence the correct functioning of such units must be regularly checked, say as part of the normal flight readiness procedures before each take-off.

A principle object of the present invention is to provide an overspeed limiter which not only protects the engine against being over-fueled but also causes any failure in its own functioning to be immediately apparent, so rendering the regular checks unnecessary.

SUMMARY OF THE INVENTION

According to the present invention, a fuel control system for a gas turbine aeroengine includes:

(a) pump means for supplying pressurised fuel to the engine;

(b) fuel control means for producing a fuel demand signal;

(c) fuel metering means for metering the pressurised fuel to the engine in accordance with the fuel demand signal, a pressure drop thereby being created across the fuel metering means;

(d) fuel recirculation means for recirculating through the pump means any fuel already pumped thereby but not passing through the fuel metering means said recirculation means including valve means for controlling the amount of fuel being so recirculated; and (e) overspeed limiter means for detecting when engine rotational speed exceeds a predetermined value indicative of an overspeed and limiting fuel flow to an amount sufficient to prevent said overspeed;

wherein the overspeed limiter means is adapted to control the magnitude of said pressure drop as a function of engine rotational speed at all times during operation of the engine except when actually performing its overspeed limiting task, the overspeed limiter means having input means responsive to said pressure drop and said engine speed and output means to said valve means for controlling operation of same such that if the pressure drop varies from that demanded by the engine speed in accordance with said function, the amount of fuel being recirculated is varied so as to vary the fuel flow through the fuel metering means by an amount sufficient to restore the pressure drop to the correct value with respect to the engine speed in accordance with said function.

Since the overspeed limiter is permanently functioning as an active part of the fuel control system, any failure in it will be immediately apparent due to its effect on the rest of the system, and appropriate action can be taken.

Conveniently, the overspeed limiter means comprises a governor arrangement whereby the pressure drop is controlled to be the above-mentioned function of the engine speed; more particularly, the governor arrangement may be adapted to control the pressure drop to be proportional to the square of the engine speed.

In the preferred embodiment the governor arrangement comprises the combination of a governor assembly and a spool valve assembly, the governor assembly being driven by an input shaft rotating at the engine rotational speed, the spool valve itself being connected across the pressure drop and the spool valve assembly being constructed such that the position of the spool valve is dependent upon the magnitude of the pressure drop, the governor assembly and spool valve assembly respectively having a first member whose position is dependent upon the speed of the input shaft and a second member whose position is dependent upon the position of the spool valve, said first and second members cooperating to define an orifice whose size is dependent upon the relative positions of the first and second members; wherein said orifice is utilised as a throttle to control a pressure difference, said pressure difference being utilised as the overspeed limiter output means for controlling operation of the valve means.

Preferably, the overspeed limiter means includes means responsive to said engine rotational speed such that when said predetermined value of engine rotational speed is exceeded, said output means causes said valve means to open sufficiently to reduce the flow of fuel through the fuel metering means to a level incapable of causing an overspeed.

More specifically, the governor assembly mentioned above may conveniently include means responsive to said engine rotational speed for changing said pressure difference when said predetermined value of engine rotational speed is exceeded, said change in said pressure difference causing said valve means to open sufficiently to reduce the flow of fuel through the fuel metering means to a level incapable of causing an overspeed.

BRIEF DESCRIPTION OF THE DRAWINGS

An embodiment of the invention will now be described, by way of example only, with reference to the accompanying drawings in which.

DETAILED DESCRIPTION OF THE DRAWINGS

Figure 1:
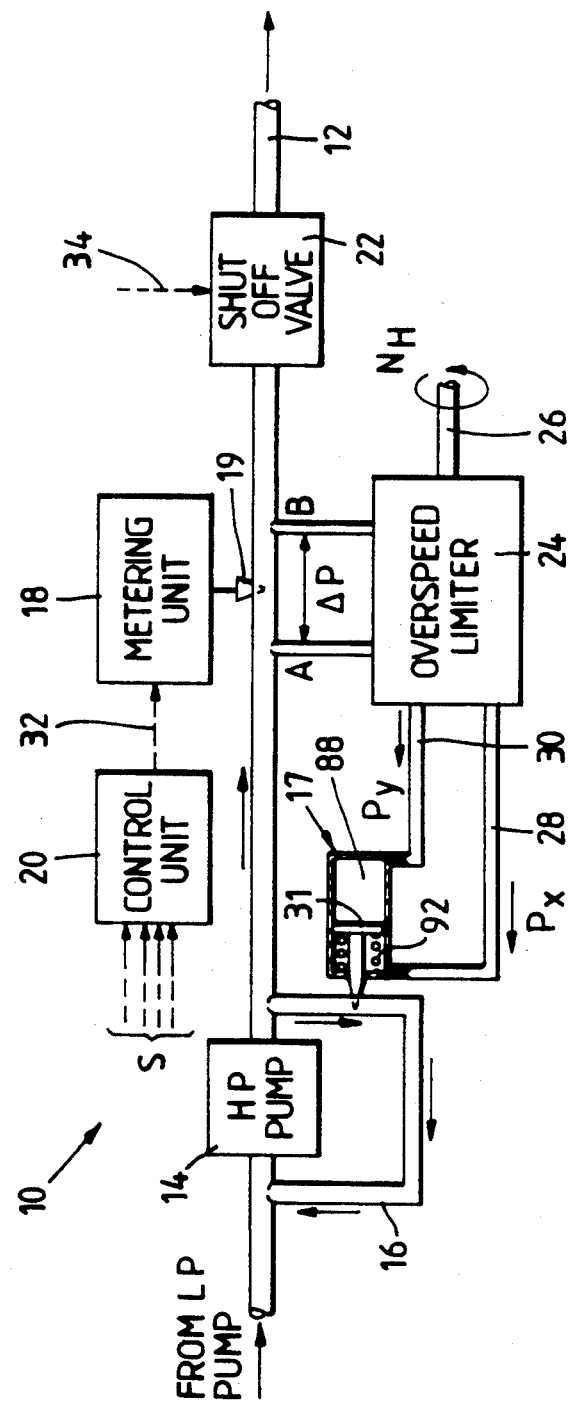
FIG. 1 is a block diagram illustrating in simplified form a fuel control system in accordance with the invention.

Referring to FIG. 1, a control system 10, for controlling fuel flow 12 to a gas turbine aeroengine (not shown), comprises various modules of which are shown only a mechanical fuel pump 14, pump spill return circuit 16 with valve 17, an electromechanical fuel flow metering unit 18 with metering valve 19, a main engine electronic control unit 20, a shut off valve unit 22, and an engine overspeed limiter unit 24.

The overspeed limiter 24 has a mechanical rotary input shaft 26 which is driven at the speed $N_H$ of the high pressure spool of the aeroengine by means of an offtake from gears on the shaft on the engine's high pressure spool. The overspeed limiter 24 is also linked by means of pressure lines 28 and 30 to the spill valve 17 which forms part of the spill return circuit 16 and controls the amount of fuel flowing through it in accordance with the relative values of pressures $P_x$ and $P_y$ output by the overspeed limiter on lines 28 and 30 respectively. Although not indicated in the diagram the control system 10 is, of course, located on or adjacent the outer casings of the aeroengine.

Apart from details associated with the overspeed limiter 24 and its functioning, the control system 10 is of known type in construction and operation and will therefore not be described in detail. In brief, the fuel is pumped from a low pressure up to a high pressure by the fuel pump 14, the output of which is throttled by the fuel metering unit 18. The latter item controls the output of the pump 14 in accordance with a valve position signal 32 produced by the electronic control unit 20 to which the fuel metering unit 18 is connected. Although the control unit 20 is here specified as electronic in nature, and is preferably part of a FADEC System, the present invention can be used with any of the other known types of fuel metering control arrangements, although it is particularly suited to electronic types of control. The electronic control unit 20 receives a number of monitor signals S from various speed, temperature and pressure sensors in the engine, these signals representing various conditions in the engine. As known in the industry it then applies certain predetermined control laws to the monitor signals for normal control of the engine and thereby produces the valve position signal 32 to control the fuel metering unit 18 with its valve 19. Finally the metered fuel 12 is passed to the engine through the shut off valve unit 22, whose purpose is to completely prevent fuel flow to the engine when the engine is shut down or before it is started, this being achieved by an electrical actuation signal 34 from the flight station of the aircraft.

As previously noted, the high pressure fuel pump 14 is provided with a spill return valve 17. It is standard practice to make this valve 17 directly responsive to the pressure drop between the points A and B across the fuel metering unit 18 so that whenever the output of the pump 14 is greater than that being allowed through to the engine by the fuel metering unit 18, the surplus fuel is recirculated to the inlet side of the pump 14 through the spill return loop 16. However, in the present invention the pressure drop $\Delta P$ across fuel metering unit 18 between points A and B is used as an input to the overspeed limiter 24 rather than being connected directly to the spill valve 17. The basic aim of this arrangement is to enable control of the pressure drop $\Delta P$ to be combined with control of overspeeds within overspeed limiter 24 by relating both these two control functions to the high pressure spool speed $N_H$.

As will be detailed later in this description, the above aim is realised in the present embodiment by designing overspeed limiter 24 as a governor arrangement which utilises the speed $N_H$ of shaft 26 not only to provide a normal control for the value of $\Delta P$ during normal operation of the engine, but also to override the normal control by quickly and drastically reducing fuel flow 12 in the event that $N_H$ exceeds a critical value, indicative of an overspeed.

For normal operation, the governor arrangement implements a control law which makes the pressure drop $\Delta P$ a function of the high pressure spool speed $N_H$; in fact the pressure drop $\Delta P$ is directly proportional to the square of the high pressure spool speed i.e. $\Delta P \alpha N_H^2$. In the context of the whole fuel control system this is accomplished by causing the difference between the two pressures $P_x$ and $P_y$ to be dependant upon both $\Delta P$ and $N_H$, the two pressures being fed to opposite sides of a piston 31 within spill valve 17 to control its position and hence control the amount of fuel flowing in the spill return loop 16 by means of the valve closure member to which the piston 31 is attached. Hence, if the pressure drop $\Delta P$ varies from that demanded by the high pressure spool speed $N_H$ in accordance with the above-mentioned control law, the overspeed limiter 24 alters the main fuel flow by means of increasing or decreasing the amount of fuel passing through the pump spill return loop 16, thereby restoring the pressure drop $\Delta P$ to the correct value.

In order to take care of the overspeed limiting requirements, the governor arrangement is also provided with a means for ensuring that when a predetermined high pressure spool speed, indicative of an overspeed, is reached, there is a step increase in the pressure $P_x$ in pressure line 28, thus causing the spill valve 17 to open quickly by a large amount and thereby provide a step increase in the pump spill return flow through return loop 16. This of course causes a step reduction in the amount of fuel 12 flowing to the engine and it is arranged that this step decrease in the fuel flow to the engine is sufficient to prevent an overspeed at all operational conditions of the engine.

The invention contains the important feature that the overspeed limiter 24 is used to control $\Delta P$ at all times during normal operation of the engine. Therefore if there is any failure in the overspeed limiter 24, it will cause the control of $\Delta P$ to veer away from adherence to the above specified control law $P\alpha N_H^2$, leading to incorrect operating characteristics of the fuel metering unit 18. In a non-electronic system incorrect operation of the fuel metering unit 18 will be apparent to the pilot in the flight station, who can take corrective action. In the present case, where the main engine control unit 20 is electronic, it can be easily programmed to detect any fault in the overspeed limiter 24 from the fact that the normal control law relationship between fuel flow rate to the engine, high pressure spool speed $N_H$, and the position of the fuel metering valve 19, is not maintained, it being assumed, of course, that the input signals S to the main engine control unit 20 include signals representing the values of the first two items and a feedback signal giving a measure of the third item. Having thus detected malfunction of the overspeed limiter 24, the software embedded in the main engine control unit 20 can be arranged not only to cause it to give a warning alert to the flight station, but also to cause it to throttle the fuel flow 12 by means of the metering unit 18, thereby forcing spill flow through a relief valve (not shown) associated with pump 14, this relief valve having a crack-open pressure somewhat higher than the normal back-pressures experienced by the pump. The overspeed limiter 24 thus provides continuous protection against those failures of the main engine control unit 20 and the fuel metering unit 18 which would cause overspeeding of the engine, whilst the electronic control unit 20 protects the aeroengine against overspeeds caused by failure of the overspeed limiter 24.

Figure 2:
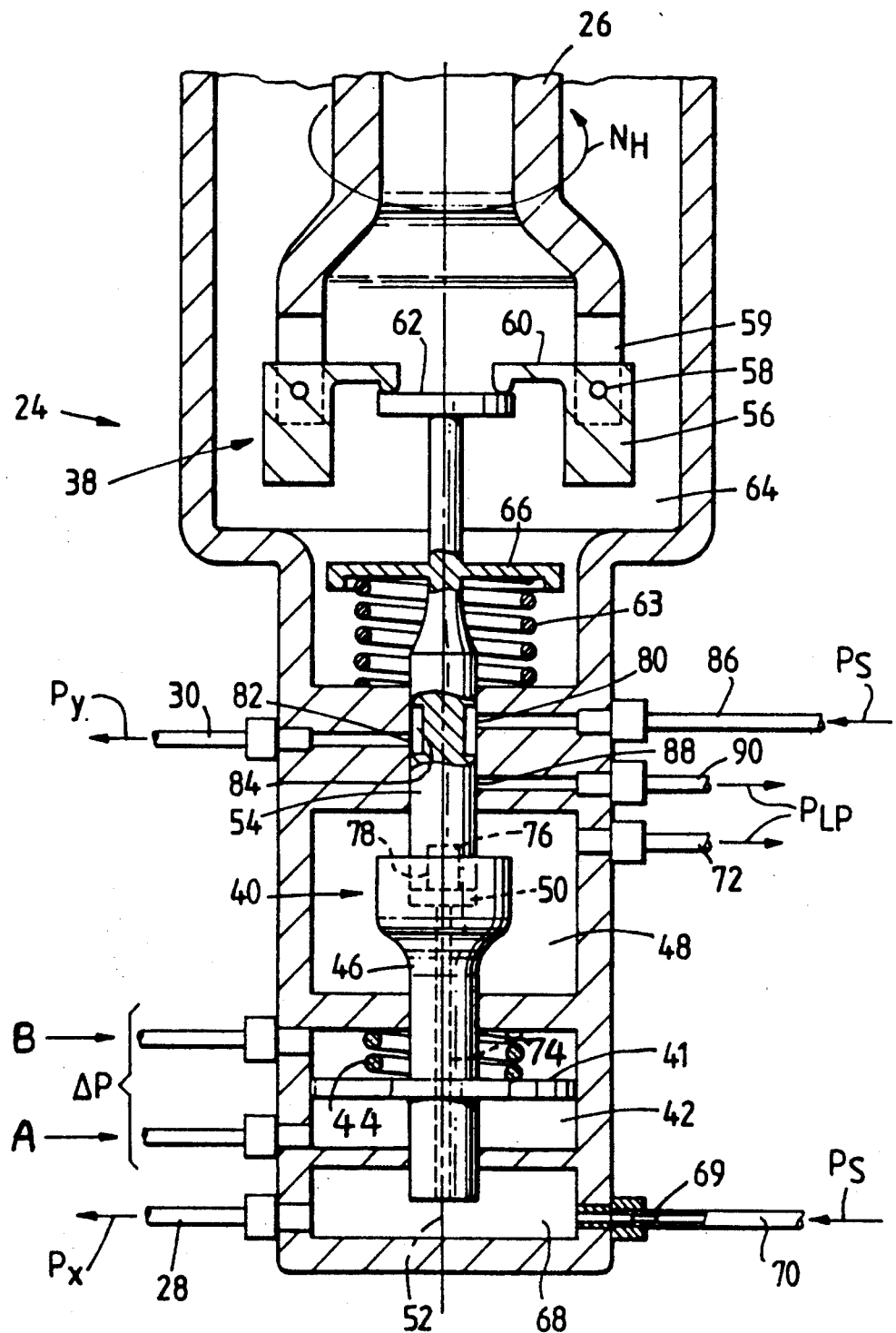
FIG. 2 is a diagrammatic representation in longitudinal cross-section of an overspeed limiter arrangement forming part of the fuel control system shown in FIG. 1.

Turning now to FIG. 2, the construction of the overspeed limiter 24 is shown in more detail. FIG. 2 shows that the governor arrangement comprising the overspeed limiter 24 is in fact the combination of a governor assembly 38 and a spool valve assembly 40. The governor assembly 38 is driven by the input shaft 26, which is held for rotation in rolling element bearings (not shown). The spool valve assembly 40 takes account of the pressure drop $\Delta P$, pressures from points A and B on either side of the fuel metering unit 18 being input to opposite sides of a piston 41 which slides within a cylinder chamber 42. The pressure at point A will always be greater than the pressure at point B while the engine is operating, but the amount by which it will be greater will vary with fuel flow 12 to the engine. Consequently, during normal operation of the engine, there is always a net force on the piston 41 acting in the upward direction as viewed in FIG. 2. Upward motion of the piston 41 is resisted by a spring 44, which renders the upward or downward movement of the piston 41 proportional to the changes in $\Delta P$.

Piston 41 is on a rod 46 which extends from chamber 42 into a further chamber 48 In this chamber 48 the rod 46 is provided with a large diameter bore 50 in its enlarged upper end, the bore 50 being centred round the rod's longitudinal axis 52. The bore 50 receives the lower end of a further rod 54 as a close fit therein and enables the two rods 46 and 54 to slide relative to each other.

The upper rod 54 is part of the governor assembly 38 and can slide up and down in its mountings. It is arranged that its position is proportional to the speed of shaft 26 by virtue of the operation of the flyweights 56 under centrifugal force. It will be apparent that when shaft 26 rotates, the flyweights 56 rotate around pivot points 58 mounted on extensions 59 projecting from a bell-mouth portion of shaft 26 so that the flyweight arms 60 bear against the top of the button flange 62 at the top end of rod 54. Consequently, the higher the shaft speed 26, the further the rod 54 is moved downwards through the action of the flyweights 56. This downward movement is resisted by a compression spring 63 which is trapped between the bottom of the governor chamber 64 and the underside of a further flange 66 on the rod 54, this spring being the means by which the movement of the rod is made proportional to the speed of shaft 26.

It is common practice in gas turbine aeroengines to utilise pressurised fuel to supply servo power to actuate various valves and other units of the control systems. In the present case the fuel servo supply pressure $P_s$ passed into a small chamber 68 at the bottom of the overspeed limiter 24 through a restrictor 69 in the servo pressure supply pipe 70. The reduced servo supply pressure $P_x$ in chamber 68 is transmitted to the spill valve 17 through line 28 in order to help control its operation. The pressurised fuel in chamber 68 is also allowed to exhaust to the upper chamber 48 which is held at a low pressure $P_{LP}$ by virtue of being connected to the low pressure side of fuel pump 14 through a pressure line 72. The connection between chambers 48 and 68 is made firstly by means of a small bore 74 centred on the longitudinal axis 52 of the rod 46 and secondly by means of an orifice 76 formed by the cooperation between the bore 50 in the upper end of the rod 46 and a slot 78 formed in the lower end of rod 54.

It will be seen from the above description and an examination of FIG. 2 that the size of the orifice 76 is controlled by the relative movement of rods 46 and 54 under the influence of pressure drop $\Delta P$ and speed $N_H$, respectively. With the above construction it is easy to arrange that if the pressure drop $\Delta P$ across the fuel metering unit 18 is not proportional to the square of the high pressure spool speed, $N_H$, the orifice 76 will vary to control the pressure $P_x$ which in turn controls the movement of the spill valve 17, so altering the main fuel flow through the fuel metering unit 18 and restoring the pressure drop $\Delta P$ to a value consistent with the chosen control law.

Overspeed limiter 24 provides its overspeed protection function by virtue of the way in which the position of the rod 54 varies in relation to three pressure ports in the body of the casing surrounding the rod 54. At normal speeds of shaft 26 the position of the rod 54 is as shown in FIG. 2 and allows the port 80 in the unit's casing to be in communication with a port 82 in the opposite side of the casing through an annular recess 84 in rod 54. Port 80 receives, via a pressure line 86, the fuel servo supply pressure $P_s$. Thus, with the rod 54 in the position shown, the servo supply pressure $P_s$ is communicated directly to the chamber 88 of the spill valve 17 by means of the pressure line 30, so that the pressure $P_y$ previously noted as being output from the overspeed limiter 24 to help control the spill valve 17, is in this case the same as the fuel servo supply pressure $P_s$. However, at a predetermined speed of the shaft 26, indicative that the engine is overspeeding, the arms 60 of the flyweights 56 exert sufficient force on the flange 62 to cause the annular recess 84 on rod 54 to move out of registration with the port 80 and into registration with the port 88 which is connected to the inlet side of the pump 14 via pressure line 90. When this happens the pressure $P_y$ in chamber 88 of spill valve 17 rapidly drops from the value $P_s$ to the value $P_{LP}$. At the same time the pressure $P_x$ in chamber 92 on the opposite side of piston 31 of spill valve 17, is maintained at a high value by the closure of orifice 76 as the rod 54 moves downwards. Consequently, the piston 31 of spill valve 17 is moved rapidly over to open the valve and cause the amount of fuel flowing through the spill return loop 16 to increase by a large amount, thereby drastically reducing fuel flow 12 to the engine by an amount sufficient to obviate the overspeed problem.

The invention in its broader aspects is not limited to the specific embodiments shown and described. Departures may be made from them within the scope of the accompanying claims without departing from the principles of the invention.

I claim:

1. A fuel control system for a gas turbine aeroengine, including:
   (a) pump means for supplying pressurized fuel to the engine;
   (b) an electronic main fuel control unit for producing a fuel demand signal;
   (c) fuel metering means for metering the pressurized fuel to the engine in accordance with the fuel demand signal a pressure drop thereby being created across the fuel metering means;
   (d) fuel recirculation means for recirculating through the pump means any fuel already pumped thereby but not passing through the fuel metering means; said recirculation means including valve means for controlling the amount of fuel being so recirculated; and
   (e) hydromechanical overspeed limiter means for detecting when engine rotational speed exceeds a predetermined value indicative of an overspeed and limiting fuel flow to an amount sufficient to prevent said overspeed;
   wherein said hydromechanical overspeed limiter means comprises means for controlling the magnitude of said fuel metering pressure drop such that said pressure drop is continuously variable as a predetermined function of engine rotational speed throughout normal non-overspeed operation of the engine, said means for controlling the magnitude of said fuel metering pressure drop comprising means responsive to said fuel metering pressure drop and said engine speed for controlling operation of said recirculation valve means such that if the fuel metering pressure drop varies from that demanded by the engine speed in accordance with said predetermined function, the amount of fuel being recirculated is varied so as to vary the fuel flow through the fuel metering means by an amount sufficient to restore the pressure drop to the correct value with respect to the engine speed in accordance with said function.

2. A fuel control system according to claim 1 in which said means responsive to said fuel metering pressure drop and said engine speed comprise two elements cooperating to define a variable orifice for throttling a fluid flow therethrough to create a variable control pressure to control operation of said recirculation valve means.

3. The fuel control system as claimed in claim 2, in which the governor means includes means for controlling the pressure drop so as to be proportional to the square of the engine speed.

4. A fuel control system according to claim 2 or claim 3 in which the governor means comprises the combination of a governor assembly and a spool valve assembly, the governor assembly being driven by an input shaft rotating at the engine rotational speed and having a first valve member whose position is dependent upon the speed of the input shaft, the spool valve assembly comprising piston means and a second valve member, the piston means being disposed across the pressure drop such that the position of the second valve member is dependent upon the magnitude of the pressure drop, so that the first and second valve members cooperate to define a variable orifice whose size is dependent upon the relative positions of the first and second valve members, duct means for connecting the variable orifice to a source of pressurized fluid, whereby the variable orifice establishes a pressure difference there-across which varies with the orifice, and means for utilizing the pressure difference to control operation of the recirculation means.

5. A fuel control system according to claim 1 in which the overspeed limiter means includes means responsive to said engine rotational speed such that when said predetermined value of engine rotational speed is exceeded, said output means causes said valve means to open sufficiently to reduce the flow of fuel through the fuel metering means to a level incapable of causing an overspeed.

6. A fuel control system according to claim 4 in which the governor assembly includes means responsive to said engine rotational speed for changing said pressure difference when said predetermined value of engine rotational speed is exceeded, said change in said pressure difference causing said valve means to open sufficiently to reduce the flow of fuel through the fuel metering means to a level incapable of causing an overspeed.

7. A fuel control system as claimed in claim 1 wherein said means responsive to said fuel metering pressure drop and said engine speed includes a rotary governor means responsive to engine speed for controlling said fuel metering pressure drop as a function of engine speed.

8. A fuel control system as claimed in claim 2 in which one of said elements is a rotary governor directly responsive to engine speed.

* * * * *